(12) United States Patent
Kinoshita

(10) Patent No.: US 11,879,757 B2
(45) Date of Patent: Jan. 23, 2024

(54) ENCODER INSTALLING STRUCTURE AND METHOD USING SPIGOT UNIT

(71) Applicant: TAMAGAWA SEIKI CO., LTD., Nagano-ken (JP)

(72) Inventor: Tomoe Kinoshita, Nagano-ken (JP)

(73) Assignee: TAMAGAWA SEIKI CO., LTD., Nagano-ken (JP)

( * ) Notice: Subject to any disclaimer, the term of this patent is extended or adjusted under 35 U.S.C. 154(b) by 0 days.

(21) Appl. No.: 18/018,909

(22) PCT Filed: Nov. 19, 2020

(86) PCT No.: PCT/JP2020/043226
§ 371 (c)(1),
(2) Date: Jan. 31, 2023

(87) PCT Pub. No.: WO2022/070436
PCT Pub. Date: Apr. 7, 2022

(65) Prior Publication Data
US 2023/0288230 A1    Sep. 14, 2023

(30) Foreign Application Priority Data
Sep. 29, 2020 (JP) ................................. 2020-163224

(51) Int. Cl.
*G01D 5/347* (2006.01)
*G01D 5/244* (2006.01)

(52) U.S. Cl.
CPC ....... *G01D 5/3473* (2013.01); *G01D 5/24442* (2013.01); *G01D 2205/60* (2021.05)

(58) Field of Classification Search
CPC ............. G01D 5/3473; G01D 5/24442; G01D 2205/60; G01D 5/34738; G01D 5/24423
See application file for complete search history.

(56) References Cited

FOREIGN PATENT DOCUMENTS

| JP | 2017227497 | * | 6/2016 |
| WO | WO2010072498 | * | 7/2010 |

* cited by examiner

*Primary Examiner* — Tony Ko
(74) *Attorney, Agent, or Firm* — Wenderoth, Lind & Ponack, L.L.P.

(57) ABSTRACT

This invention is concerning easily installing an encoder main unit to a disk unit disposed on a shaft, without contacting a light-receiving element and an LED. An encoder installing structure and method using a spigot unit according to this invention are a configuration and method including: a shaft end which is a spigot inserting portion of a motor shaft of a motor; a disk unit which is fitted in an outer periphery of the shaft end so as to be fitted as a first spigot fitting portion and includes a disk; a screw hole which is formed at a shaft center of the shaft end along a shaft direction of the motor shaft.

4 Claims, 5 Drawing Sheets

ENCODER INSTALLING STRUCTURE AND METHOD USING SPIGOT UNIT

TECHNICAL FIELD

This invention relates to an encoder installing structure and method using a spigot unit, more particularly to a new improvement for inserting an encoder main unit to a disk from the side, which is an orthogonal direction intersecting orthogonally with a shaft direction, using a structure of a spigot.

BACKGROUND ART

An example of this type of an encoder installing structure and method using a spigot unit, which has been used conventionally, is a configuration and a method of PTL 1 (a first conventional configuration). PTL 1 discloses: a configuration that a recessed spigot fitting portion is disposed at an encoder installing portion of a measurement target object; a spigot inserting portion, which is inserted into the spigot fitting portion and can be fitted with the measurement target object, is disposed on the side of installing the measurement target object of the encoder main unit; and this spigot inserting portion includes diameter expanding means for firmly fixing the measurement target object to the spigot fitting portion by at least partially expanding a diameter of the spigot inserting portion.

FIGS. 7 to 10 indicate a second conventional configuration manufactured in-house, although reference literature and the like thereof are not disclosed.

In FIG. 7, a reference numeral 1 indicates a disk support member on which a disk 2 is fixed, and in the disk support member 1, a first and second screw holes 3 and 4, which are through holes of which hole directions are orthogonal to each other, are formed.

At a shaft center of the disk support member 1, a shaft hole 7, which penetrates from a top face 1a to a bottom face 1b and into which a motor shaft 6 of a motor 5 indicated in FIG. 10 is fitted, is formed.

The motor shaft 6 fitted into the shaft hole 7 is tightened by the tips of first and second screws 10 and 10A, screwed into the screw holes 3 and 4 respectively, and the motor shaft 6 is fixed to the disk support member 1 by the screws 10 and 10A.

This means that a disk unit 11 is constituted by the disk support member 1, the disk 2, the first and second screws 10 and 10A, and the shaft hole 7.

In FIG. 8, an encoder main unit 12, which includes the above mentioned disk unit 11, is disposed on an end face 5A of the motor 5, and an LED 13 is disposed in the encoder main unit 12.

On the encoder main unit 12, a component substrate 16, where a light-receiving element 14 is disposed on the rear face and an electronic component 15 is disposed on the front face, is disposed, and a connector 17 is connected to the front face of the component substrate 16.

Further, as illustrated in FIG. 9, a pair of notches 20 which face each other at a 180° interval are formed on the component substrate 16 and the encoder main unit 12.

CITATION LIST

Patent Literature

[PTL 1] Japanese Patent Application Publication No. 2002-195853

SUMMARY OF INVENTION

Technical Problem

The conventional encoder installing structure using the spigot unit configured as above has the following problems.

That is, in the case of the above mentioned first conventional configuration, the spigot inserting portion must be formed using the spigot fitting portion having considerable depth on the end face of the motor, hence it is difficult to compactly install the disk main unit to the motor.

In the case of the second conventional configuration illustrated in FIGS. 7 to 10, on the other hand, the disk unit 11 is inserted into the outer periphery of the motor shaft 6 of the motor 5, and then the encoder main unit 12 is diagonally inserted avoiding the disk unit 11, protecting the light-receiving element 14 from contacting the disk 2. Thereafter the disk unit 11 is fixed to the motor shaft 6 by tightening the pair of screws 10 and 10A of the disk support member 1.

This means that when the encoder main unit 12 is installed on the end face 5A of the motor 5, the encoder main unit 12 is inserted in an inclined position while maintaining a small gap G between the light-receiving element 14 and the disk 2 (see FIG. 8). Hence the light-receiving element 14 may contact with the disk 2, and either one may be damaged. In such a case, the components may require replacement and improving production yield becomes difficult. Furthermore, the encoder main unit 12 is inserted into the disk unit 11 first, then the small gap G between the light-receiving element 14 and the disk 2 is adjusted, which means that adjustment is difficult, and in some cases accuracy may not improve. After the adjustment, the disk unit 11 is fixed to the motor shaft 6 using the pair of screws 10 and 10A of the disk support member 1, whereby the encoder main unit 12 is also fixed.

To solve the above problems, it is an object of this invention to provide an installing structure and method thereof using the spigot structure such that the encoder main unit can be inserted into the disk from the side, which is the orthogonal direction intersecting orthogonally with the shaft direction, without requiring a difficult adjustment of the gap G.

Solution to Problem

An encoder installing structure using a spigot unit according to this invention is a configuration including: a shaft end which is a spigot inserting portion of a motor shaft of a motor; a disk unit which is fitted in an outer periphery of the shaft end as a first spigot fitting portion and includes a disk; a screw hole which is formed at a shaft center of the shaft end along a shaft direction of the motor shaft; a fixing screw which is disposed in the disk unit and is screwed into the screw hole; and an encoder main unit which is disposed in the disk unit and includes a light-receiving element and an LED disposed sandwiching the disk, wherein the encoder main unit is inserted into the disk from the side which is a direction intersecting orthogonally with the shaft direction. A spigot inserting plate is installed on an end face of the motor or an outer periphery, a linear portion and a protruded portion constituting a second spigot fitting portion having the same shape as the spigot inserting plate are formed on the end face of the motor, an inner periphery of the second spigot fitting portion of the encoder main unit is engaged with an outer periphery of the spigot inserting plate or the outer periphery of the second spigot fitting portion, and the encoder main unit is fixed at a predetermined angle position on the end face by rotating the encoder main unit by a predetermined angle. Further, an encoder installing method using a spigot unit according to this invention is a method using: a shaft end which is a spigot inserting portion of a motor shaft of a motor; a disk unit which is fitted in an outer periphery of the shaft end as a first spigot fitting portion and includes a disk; a screw hole which is formed at a shaft center of the shaft end along a shaft direction of the motor shaft; a fixing screw which is disposed in the disk unit and is screwed into the screw hole; and an encoder main unit which is disposed in the disk unit and includes a light-receiving element and an LED disposed sandwiching the disk, wherein the encoder main unit is configured to be inserted into the disk from the side which is a direction intersecting orthogonally with the shaft direction. In the encoder installing method], a spigot inserting plate is installed on an end face of the motor or an outer periphery, a linear portion and a protruded portion constituting a second spigot fitting portion having the same shape as the spigot inserting plate are formed on the end face of the motor, an inner periphery of the second spigot fitting portion of the encoder main unit is engaged with an outer periphery of the spigot inserting plate or the outer periphery of the spigot fitting portion, and the encoder main unit is fixed at a predetermined angle position on the end face by rotating the encoder main unit by a predetermined angle.

Advantageous Effects of Invention

The encoder installing structure and method using a spigot unit according to this invention are configured as described above, hence the following effects are implemented. In other words, the encoder installing structure and method using a spigot unit according to this invention is a configuration and a method including: a shaft end which is a spigot inserting portion of a motor shaft of a motor; a disk unit which is fitted in an outer periphery of the shaft end as a first spigot fitting portion and includes a disk; a screw hole which is formed at a shaft center of the shaft end along a shaft direction of the motor shaft; a fixing screw which is disposed in the disk unit and is screwed into the screw hole; and an encoder main unit which is disposed in the disk unit and includes a light-receiving element and an LED disposed sandwiching the disk, wherein the encoder main unit is configured to be inserted into the disk from the side which is a direction intersecting orthogonally with the shaft direction. Since the spigot structure is used for installing the disk unit to the motor shaft, and the encoder main unit is inserted from the side of the disk unit after the fixing screw is screwed into the screw hole, which is formed along the shaft direction of the motor shaft, and the screw is completely tightened, the disk unit can be installed without adjusting the gap between the light-receiving element and the disk, and installation accuracy improves. Further, installation accuracy of the disk unit to the motor shaft also improves, and the encoder main unit can be inserted to the disk from the side.

Furthermore, the encoder main unit can be easily fixed to the motor using the spigot structure, since this invention is configured such that the spigot inserting plate is installed or the second spigot fitting portion is formed on the end face of the motor, and the encoder main unit is engaged with the outer periphery of the spigot inserting plate or the outer periphery of the second spigot fitting portion, and the encoder main unit is fixed at a predetermined angle position on the end face by rotating the encoder main unit by a predetermined angle.

DESCRIPTION OF EMBODIMENTS

It is an object of the encoder installing structure and method using a spigot unit according to this invention to allow to insert the encoder main unit to a disk from the side, which is an orthogonal direction intersecting orthogonally with the shaft direction, by using a structure of a spigot.

Examples

Preferred embodiments of the encoder installing structure and method using a spigot unit according to this invention will be described with reference to the drawings.

A portion that is the same or equivalent to a prior art is denoted with a same reference sign in the description.

Figure 1:
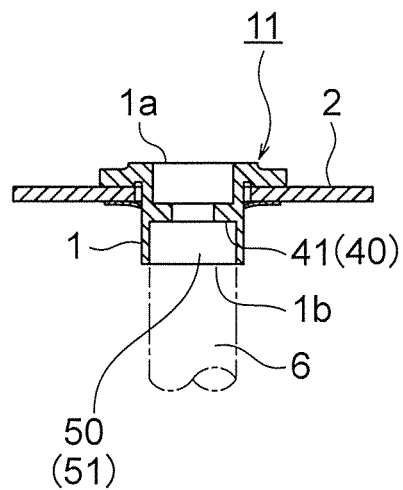
FIG. 1 is a cross-sectional view of a disk unit in the encoder installing structure and method using a spigot unit according to an embodiment of this invention.

In FIG. 1, the reference numeral 1 indicates a disk support member on which a disk 2 is fixed, and is configured such that a first spigot fitting portion 41 is formed in a recessed portion 40 of the disk support member 1, and a spigot inserting portion 50 constituted of a later mentioned shaft end 51 of a motor shaft 6 is fitted with the first spigot fitting portion 41.

This means that a disk unit 11 is constituted by the disk support member 1, the disk 2, the recessed portion 40, the first spigot fitting portion 41 and the spigot inserting portion 50.

Figure 2:
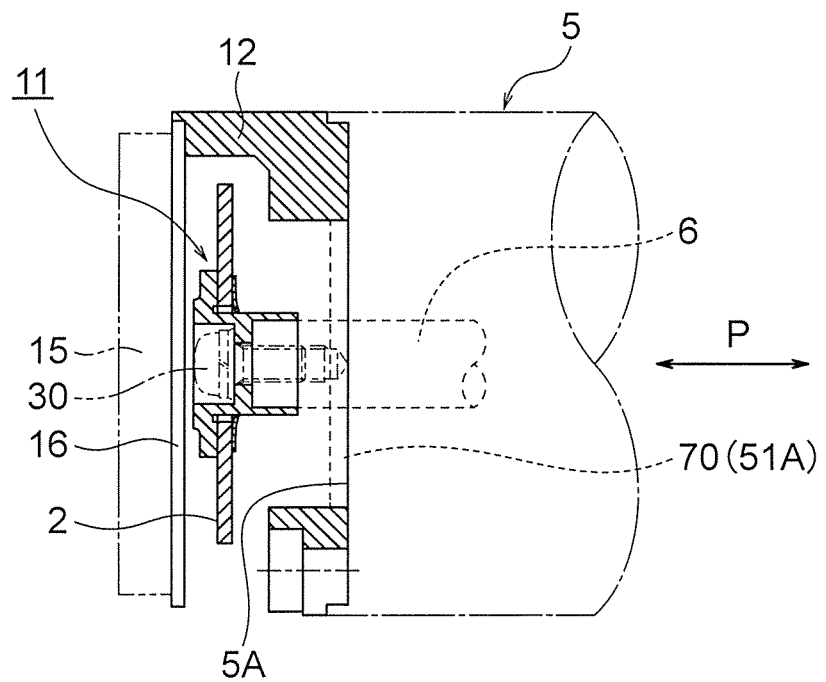
FIG. 2 is a cross-sectional view at the D-O-D line in FIG. 4, which indicates the encoder main unit in which the disk unit in FIG. 1 is installed.

FIG. 2 indicates an encoder main unit 12 where the disk unit 11 is integrated on an end face 5A of a motor 5, and a component substrate 16, having an electronic component 15, is disposed on the encoder main unit 12.

Figure 3:
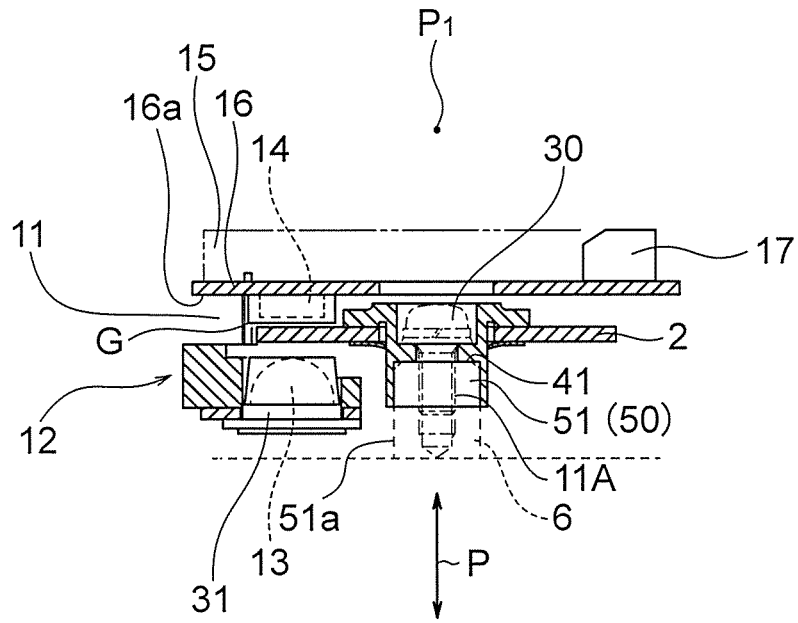
FIG. 3 is a cross-sectional view of a configuration where a light-receiving element and an LED are installed in FIG. 2.

FIG. 3 indicates a state where a fixing screw 30 is screwed into a screw hole 11A, which is formed at a shaft center of the disk unit 11 in FIG. 2, along a shaft direction P of the motor shaft 6, and the disk unit 11 is fixed to the motor shaft 6 by the fixing screw 30.

On an LED installing portion 31 of the encoder main unit 12, an LED 13 is disposed facing the disk 2 side, and on a rear face 16a of the component substrate 16, a light-receiving element 14 is disposed facing the disk 2 side.

This means that the LED 13 and the light-receiving element 14 face each other sandwiching the disk 2, so that the light of the LED 13 is received by the light-receiving element 14 via a slit (not illustrated) of the disk 2, and pulsed signals can be extracted and outputted to the outside as encoder signals via a connector 17 connected to the component substrate 16.

By using the encoder installing structure to the motor according to an embodiment of this invention depicted in FIGS. 1 to 5, the disk unit 11 is first fitted and fixed to the shaft end 51 of the motor shaft 6 using the spigot fitting portion 41 and the spigot inserting portion 50. Then the fixing screw 30 is tightened in the shaft direction of the motor 5 using a screwdriver, whereby fixing of the disk unit 11 to the motor shaft 6 is completed.

The encoder main unit 12 can be installed either by using a spigot inserting plate 70 attached to an end face 5A of the motor 5, or by using a spigot fitting reference portion of a second spigot fitting portion 51A which has the same shape as the spigot inserting plate 70, and is constituted of an outer periphery 51B, a linear portion 51D and a protruded portion 51E.

Therefore in the case of installing the encoder main unit 12 to the end face 5A of the motor 5, the disk unit 11 is fixed at a predetermined position of the motor shaft 6, hence at the spigot fitting reference portion disposed on the end face 5A of the motor 5, the encoder main unit 12 can be inserted to the disk 2 from the side $P_1$, which is the direction intersecting orthogonally with the shaft direction P, that is, the direction intersecting orthogonally with the page surface of FIG. 3.

This means that installation can be safely completed without inclining the direction of the encoder main unit 12 to figure out the correct inserting direction thereof, or without contacting the light-receiving element 14 and the LED 13 from the side $P_1$, or without causing damage, as in the case of prior art.

Figure 4:
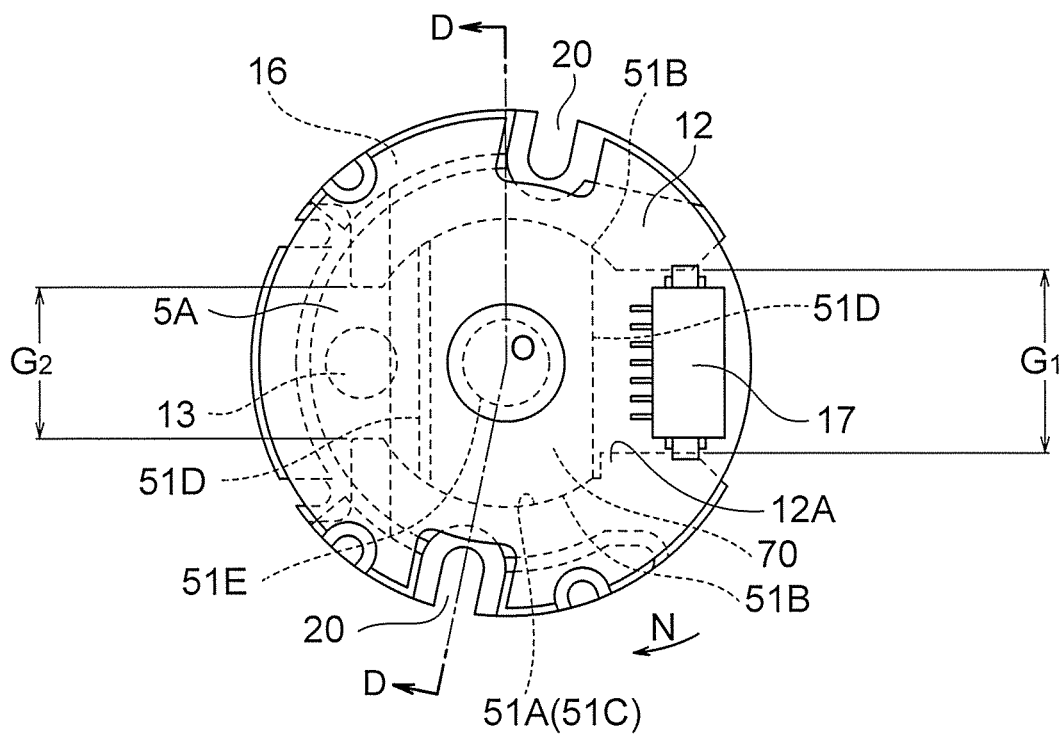
FIG. 4 is a plan view of FIG. 3.

FIG. 4 is a plan view depicting the states of FIGS. 2 and 3 where the disk unit 11 and the encoder main unit 12 are installed in the motor 5, where the spigot inserting plate 70 is installed on the end face 5A of the motor 5 or the outer periphery 51B, the linear portion 51D and the protruded portion 51E constituting the spigot fitting portion 51A, having the same shape as the spigot inserting plate 70, is formed on the end face 5A of the motor 5, then an inner periphery 51C of the second spigot fitting portion 51A of the encoder main unit 12 is engaged with the outer periphery 51B of the spigot inserting plate 70 or the outer periphery 51B of the second spigot fitting portion, and the encoder main unit 12 is fixed at a predetermined angle position on the end face 5A by rotating the encoder main unit 12 by a predetermined angle (e.g. 90°), so as to be engaged with a step portion 12A of the encoder main unit 12.

FIG. 4 indicates a plan view when the encoder main unit 12 rotated 90° and stopped at a predetermined angle position, and is fixed to the motor 5 by screws (screws are not illustrated) via notches 20.

Figure 5:
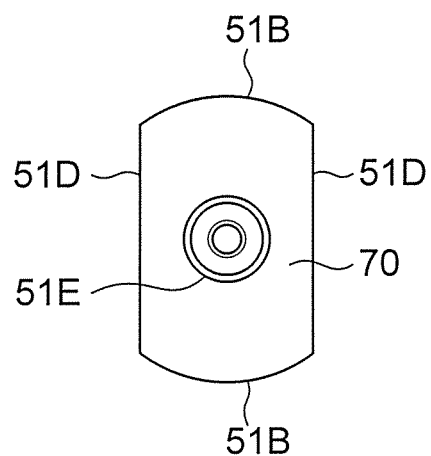
FIG. 5 is a plan view depicting a spigot inserting plate disposed at the end portion of the motor or a second spigot fitting portion formed at the end portion of the motor.

FIG. 5 indicates a plan view of the outer periphery 51B, the linear portion 51D and the protruded portion 51E constituting the spigot fitting portion 51A formed on the spigot inserting plate 70 or on the end face 5A of the motor 5.

Figure 6:
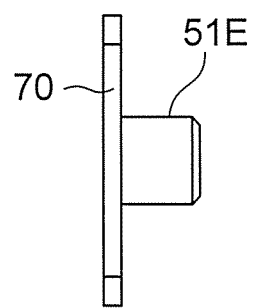
FIG. 6 is a left side view of FIG. 5.
Figure 7:
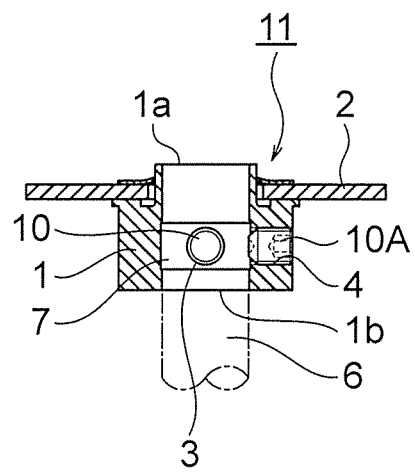
FIG. 7 is a cross-sectional view of a disk unit having a conventional configuration.
Figure 8:
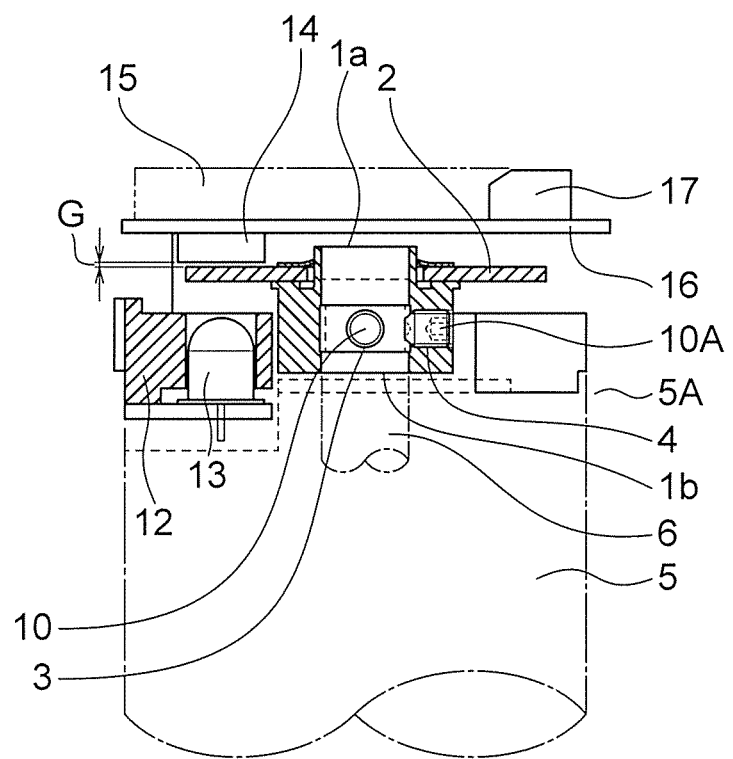
FIG. 8 is a cross-sectional view in the case where the disk unit in FIG. 7 is installed in the encoder main unit.
Figure 9:
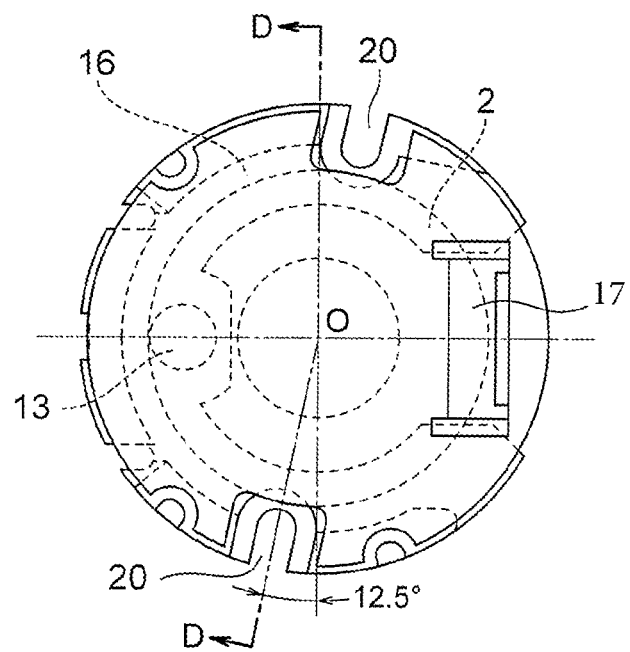
FIG. 9 is a plan view of FIG. 8.
Figure 10:
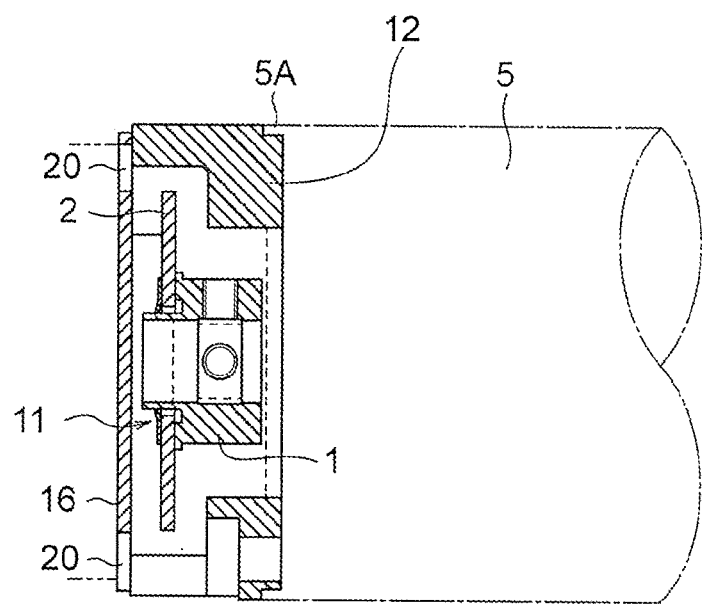
FIG. 10 is a cross-sectional view at the D-O-D line in FIG. 9.

FIG. 6 is a left side view of the outer periphery 51B, the linear portion 51D and the protruded portion 51E constituting the spigot fitting portion 51A formed on the spigot inserting plate 70 or the end face 5A of the motor 5 in FIG. 5, and includes the protruded portion 51E which protrudes toward the shaft center.

The spigot structure on the motor side in FIGS. 5 and 6 may have two types of configurations: forming the configuration of the outer periphery 51B, the linear portion 51D and the protruded portion 51E on the end face 5A of the motor, as described above; and installing only the spigot inserting plate 70, which does not include the protruded portion protruding toward the shaft center, on the motor shaft 6 of the motor 5 having the shaft. As indicated in FIGS. 3, 4, 5 and 6, the outer periphery 51B, the linear portion 51D and the protruded portion 51E are common between the spigot inserting plate 70 and the second spigot fitting portion 51A, since the spigot inserting plate 70 and the second spigot fitting portion 51A have the same shape, although are differentiated by a solid line and a dotted line.

Further, as mentioned above, in the case of engaging the encoder main unit 12 with the outer periphery 51B of the spigot inserting plate 70 or the outer periphery 51B of the second spigot fitting portion 51A, as indicated in FIGS. 3 and 4, if one gap $G_1$, out of the gaps $G_1$ and $G_2$ formed on the left and right of the encoder main unit 12, slides outside a pair of the linear portions 51D of the spigot inserting plate 70, the gap $G_1$ contacts with the upper part of each outer periphery 51B.

If the encoder main unit 12 is rotated in the direction of the arrow N in this state, the inner periphery 51C of the second spigot fitting portion 51A engages with each outer periphery 51B having an arc shape, as indicated in FIG. 4, and the installation of the encoder main unit 12 to the end face 5A of the motor 5 completes, as indicated in FIGS. 2 and 4. In other words, as mentioned above, the encoder main unit 12 is inserted to the disk 2 from the side $P_1$ which is a direction intersecting orthogonally with the shaft direction P.

Similar functional effects can be acquired even in the case of using the above mentioned second spigot fitting portion 51A instead of using the spigot inserting plate 70.

INDUSTRIAL APPLICABILITY

The encoder installing structure and method using the spigot unit according to this present invention allows to insert the encoder main unit having the LED and the light-receiving element to the disk from the side, which is the orthogonal direction intersecting orthogonally with the shaft direction, because the structure of the spigot is used. Therefore the encoder can be installed and adjusted very easily after the disk is fixed.

The invention claimed is:

1. An encoder installing structure using a spigot unit, comprising:
    a shaft end (51) which is a spigot inserting portion (50) of a motor shaft (6) of a motor (5);
    a disk unit (11) which is fitted in an outer periphery (51a) of the shaft end (51) as a first spigot fitting portion (41) and includes a disk (2);
    a screw hole (11A) which is formed at a shaft center of the shaft end (51) along a shaft direction (P) of the motor shaft (6);
    a fixing screw (30) which is disposed in the disk unit (11) and is screwed into the screw hole (11A); and
    an encoder main unit (12) which is disposed in the disk unit (11) and includes a light-receiving element (14) and an LED (13) disposed sandwiching the disk (2), wherein
    the encoder main unit (12) is inserted into the disk (2) from the side ($P_1$) which is a direction intersecting orthogonally with the shaft direction (P).

2. The encoder installing structure using the spigot unit according to claim 1, wherein:
    a spigot inserting plate (70) is installed on an end face (5A) of the motor (5) or an outer periphery (51B), a linear portion (51D) and a protruded portion (51E)

constituting a second spigot fitting portion (51A) having the same shape as the spigot inserting plate (70) are formed on the end face (5A) of the motor (5), an inner periphery (51C) of the second spigot fitting portion (51A) of the encoder main unit (12) is engaged with an outer periphery (51B) of the spigot inserting plate (70) or the outer periphery (51B) of the spigot fitting portion (51A), and the encoder main unit (12) is fixed at a predetermined angle position on the end face (5A) by rotating the encoder main unit (12) by a predetermined angle.

3. An encoder installing method using a spigot unit, using:

a shaft end (51) which is a spigot inserting portion (50) of a motor shaft (6) of a motor (5);

a disk unit (11) which is fitted in an outer periphery (51*a*) of the shaft end (51) as a first spigot fitting portion (41) and includes a disk (2);

a screw hole (11A) which is formed at a shaft center of the shaft end (51) along a shaft direction (P) of the motor shaft (6);

a fixing screw (30) which is disposed in the disk unit (11) and is screwed into the screw hole (11A); and an encoder main unit (12) which is disposed in the disk unit (11) and includes a light-receiving element (14) and an LED (13) disposed sandwiching the disk (2), wherein the encoder main unit (12) is inserted into the disk (2) from the side (P1) which is a direction intersecting orthogonally with the shaft direction (P).

4. The encoder installing method using the spigot unit according to claim 3, comprising steps of:

installing a spigot inserting plate (70) on an end face (5A) of the motor (5), or forming an outer periphery (51B), a linear portion (51D) and a protruded portion (51E) constituting a second spigot fitting portion (51A) having the same shape as the spigot inserting plate (70) on the end face (5A) of the motor (5);

engaging an inner periphery (51C) of the second spigot fitting portion (51A) of the encoder main unit (12) with the outer periphery (51B) of the spigot inserting plate (70) or the outer periphery (51B) of the spigot fitting portion (51A); and fixing the encoder main unit (12) at a predetermined angle position on the end face (5A) by rotating the encoder main unit (12) by a predetermined angle.

\* \* \* \* \*